(12) United States Patent
Buzbee et al.

(10) Patent No.: US 6,275,981 B1
(45) Date of Patent: Aug. 14, 2001

(54) METHOD AND SYSTEM FOR CORRELATING PROFILE DATA DYNAMICALLY GENERATED FROM AN OPTIMIZED EXECUTABLE PROGRAM WITH SOURCE CODE STATEMENTS

(75) Inventors: William B Buzbee, Half Moon Bay; Michelle A. Ruscetta; Carol L. Thompson, both of San Jose, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/190,994

(22) Filed: Nov. 12, 1998

(51) Int. Cl.$^7$ .................................................. G06F 9/45
(52) U.S. Cl. ........................................ 717/4; 717/9
(58) Field of Search ............................... 717/4–9

(56) References Cited

U.S. PATENT DOCUMENTS

| | | | |
|---|---|---|---|
| 5,713,010 * | 1/1998 | Buzbee et al. | 395/507 |
| 5,768,592 * | 6/1998 | Chang | 395/704 |
| 5,815,720 * | 9/1998 | Buzbee | 395/709 |
| 5,964,867 * | 10/1999 | Anderson et al. | 712/219 |

OTHER PUBLICATIONS

Ball et al. Optimally Profiling and Tracing Programs. ACM. pp. 1319–1360, Jul. 1994.*
Hall. Call Path Profiling. ACM. pp. 296–306, 1992.*

* cited by examiner

Primary Examiner—Kakali Chaki
Assistant Examiner—Wei Zhen

(57) ABSTRACT

A method and system for relating profile data generated by monitoring the execution of an optimized machine-code computer program back to the source-language description of the computer program. Logical line numbers are associated with the basic blocks of the intermediate-code representation of the computer program and actual line numbers are associated with each instruction of the intermediate-code representation of the computer program. During optimization of the intermediate code, the logical line numbers remain fixed to basic blocks, while actual line numbers remain fixed to intermediate-code instructions. A branch instruction and the target of the branch instruction in the optimized machine-code computer program or in an optimized assembly-language computer program can be related back to source-language statements by using the actual line number associated with the branch instruction and the logical line number associated with the basic block that contains the target of the branch instruction.

19 Claims, 2 Drawing Sheets

METHOD AND SYSTEM FOR CORRELATING PROFILE DATA DYNAMICALLY GENERATED FROM AN OPTIMIZED EXECUTABLE PROGRAM WITH SOURCE CODE STATEMENTS

TECHNICAL FIELD

The present invention relates to the run-time performance analysis of computer software programs compiled by optimizing compilers and, in particular, to a method and system for correlating run-time profile data collected during the execution of an optimized machine-code version of a program with the source-language program from which the machine-code version of the program is generated.

BACKGROUND OF THE INVENTION

Compilers are programs that translate computer programs written in source languages, such as FORTRAN, Pascal, C, and C++, into equivalent compiled programs consisting of assembly-language instructions or machine-code instructions. During the compilation process, a compiler may first translate a source-language program into intermediate code and then, during later stages of the compilation process, the compiler may optimize the intermediate code to produce the final assembly-language or machine-code version of the source-language program. Although there is a fairly direct sequential correspondence between the source-language program statements and the intermediate code, subsequent optimizations carried out by a compiler during the later stages of compilation may result in deletion of intermediate code instructions, duplication of intermediate code instructions, or significant alteration of the sequential order of the intermediate code instructions. As a result, the instructions of the final assembly-language or machine-code program may not directly correspond to the original source-language program. Because of this lack of direct correspondence, it may be difficult or impossible to select a particular assembly-language or machine-code instruction from the compiled program and relate that instruction back to a particular line or source-language statement in the source-language program.

A common tool used by programmers to analyze the run-time behavior of compiled programs is to generate run-time profile data. This process generates the relative frequencies at which each instruction in the assembly-language or machine-code program is executed during execution of the program. Profile data may be collected over multiple executions of the program using different input data in order to generate frequencies of execution of instructions under a representative average of various run-time conditions. The profile data may be generated by statistically sampling the contents of a program counter that contains an indication of the instruction currently being executed by a computer. Alternatively, profile data may be generated by trapping the computer prior to, or after, execution of each of a number of different instructions and incrementing a counter for the trapped instruction. A more recent profiling technique involves generation of profile data by dynamic translation of compiled programs, according to the teachings of U.S. Pat. No. 5,815,720, "Use of Dynamic Translation to Collect and Exploit Run-Time Information in an optimizing Compilation System." This technique avoids a compilation step to produce instrumented machine-language or assembly-language code. Another recent profiling technique involves the use of special hardware support included in modern processors for run-time branch prediction to generate profile data, as outlined in: "Using Branch Handling Hardware to Support Profile-Driven Optimization," Conte, Patel, and Cox, Proceeding of the 1994 27th Annual International Symposium on Microarchitecture, November 30–December 2 (San Jose, Calif.).

Profile data may be used by certain optimizing compilers to perform optimizations on the profiled source code to produce a more efficient version of the source code. Profile data may also be used by a programmer in order to analyze a program, in which case the profile data may be presented as a histogram, or, when possible, the source-language version of the program may be annotated to indicate the relative frequencies of execution for the various statements within the source-language program. Whether used directly by an optimizing compiler, or used by a programmer for analysis, the profile data collected from compiled program assembly-language or machine-code instructions needs to be correlated with the source-language statements to which the assembly-language or machine-code instructions correspond.

The problem of correlating profile data with a source-language program is difficult when the assembly-language or machine-code version of the program is generated by an optimizing compiler. In this case, as noted above, there is generally no way to correlate particular assembly-language or machine-code instructions to specific statements within the source-language program because of instruction duplication, elimination, or resequencing.

Certain prior profile-based optimization systems require that profile data be gathered using a specially instrumented and unoptimized version of a source-language program. However, this approach may be problematic for a number of reasons. First, profile data may be collected on a machine that includes only the optimized executable program. On such machines, there will be no specially instrumented and unoptimized version of the program for profiling. Also, certain problems and pathological behaviors that occur during execution of an optimized assembly-language or machine-code program may not occur during execution of the unoptimized assembly-language or machine-code version of the program. If the profile data is being used to identify the cause of such pathological behavior, then profile data collected from a specially instrumented unoptimized version of the program is not useful.

A need has therefore been recognized in the area of performance analysis of computer programs for an improved method for collecting profile data during the execution of optimized assembly-language or machine-code programs and relating the collected profile data back to the source-language program from which the optimized assembly-language or machine-code versions of the program are generated. Such a method needs to allow for collection of useful profile data generated from running optimized assembly-language or machine-code programs, and needs to provide way for profile data generated from optimized assembly-language or machine-code programs to be related back to the source-language programs from which the assembly-language or machine-code program is generated.

SUMMARY OF THE INVENTION

The present invention provides a method for correlating profile data collected during execution of an optimized executable program back to the source-language statements within a source-language program from which the executable program is generated by an optimizing compiler. The optimizing compiler associates each intermediate-code instruction generated by the optimizing compiler with an actual line number, or, in other words, the line number of the source-language statement that generated the intermediate-code instruction. The optimizing compiler groups intermediate-code instructions together into basic blocks and associates each basic block with one or more logical line numbers. The logical line numbers refer to the line number of the source-language statement from which the intermediate-code instructions within a basic block are generated. At the intermediate-code level, there is a direct correspondence between logical line numbers and actual line numbers. The optimizing compiler may eliminate, duplicate, or move intermediate-code instructions within the basic block framework generated for the intermediate-code in order to produce a final, optimized version of the program. The actual line numbers associated with each intermediate code-instruction are moved, eliminated, or duplicated along with the intermediate-code level instructions during the optimization process. However, the logical line numbers remain fixed to basic blocks. When a basic block is eliminated, the logical line numbers associated with the basic block are marked as being unexecutable. When a basic block is duplicated, then the logical line numbers associated with the basic block are duplicated. Thus, optimization can be considered to be a process of eliminating, duplicating, and, most commonly, rearranging intermediate-code instructions, along with associated actual line numbers, within a fixed framework of basic blocks having fixed logical line numbers.

The optimizing compiler stores logical line numbers and actual line numbers along with the final assembly-language or machine-code instructions. Either during collection of profile data, or, after the profile data has been collected, the method of the present invention relates optimized instructions back to specific source-language statements by using logical line numbers and actual line numbers associated with the optimized instructions. Generally, branch instructions are most critical for profiling the execution of a program. The method constructs, from the profile data, a network of arcs to indicate the relative frequencies at which an each branch instruction causes execution control to be transferred to the various possible target instructions of each branch instruction. Each arc comprises an actual line number associated with a branch instruction, a logical line number associated with a target instruction of the branch instruction, and a relative frequency for the branching operation represented by the branch instruction and target instruction. By using the actual line number associated with the branch instruction, the method can correlate a branch instruction that may have been moved or duplicated back to a particular source-language line. By using the logical line number associated with the target instruction, the method can correlate a target instruction that may have been moved or duplicated back to a particular source-language line. The present invention creates a table representing the network of branch/target arcs. The contents of this table can then be used to annotate source-language programs to indicate the relative frequencies at which execution control is transferred by control statements within the source-language program to various source-language statements that are targets of the control statements.

DETAILED DESCRIPTION OF THE INVENTION

Figure 1:
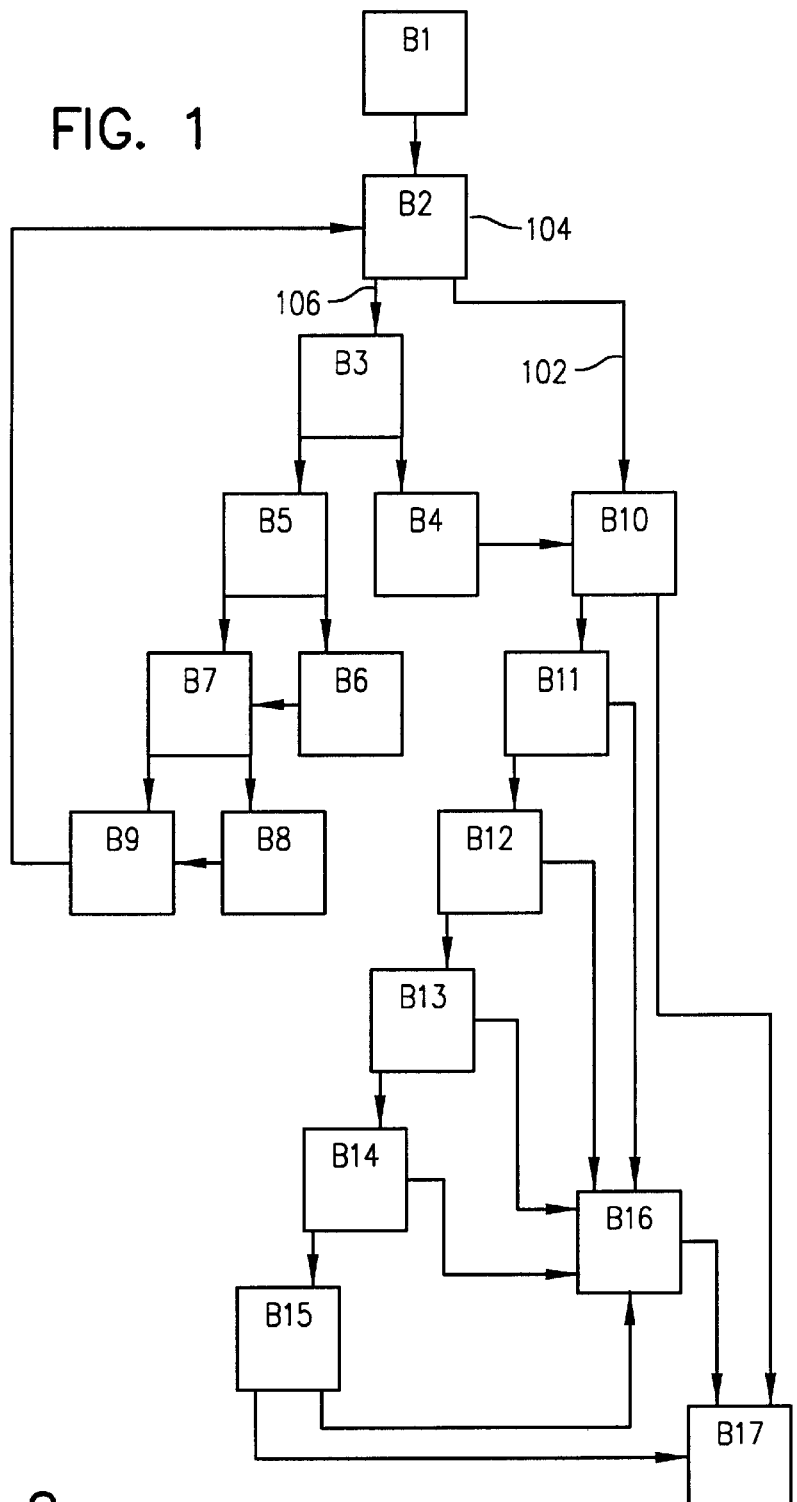
FIG. 1 shows a control flow graph that represents the intermediate-level assembly-language version of the routine "skewed."

The present invention will be described below in four subsections. In the first subsection, an example source-language routine is presented along with an unoptimized, intermediate-level, assembly-language version of the routine. Then, the concept of a control flow graph comprising linked basic blocks is presented, and profile data is generated from the assembly-language version of the routine and correlated with the source-language routine. In the second subsection, an optimized assembly-language version of the routine is presented. Profile data is generated for this optimized version of the assembly-language routine, and the difficulty of correlating this profile data with the original source-language routine is demonstrated. In the third subsection, the present invention is described in terms of the example routine and the optimized assembly-language version of the example routine described in the first two subsections. Finally, an implementation of the present invention is presented in the fourth subsection.

Introduction and Example

A short, pseudo-code routine, called "skewed," is provided below:

```
int skewed (int *scores, int num)
{
    int i, sum, mid, low, high, average, res;
    res=-1;
    i=0;
    sum=0;
    while (i<num)
    {
        if (num<1)
        {
            res=0;
            break;
        }
        if (i==0) low=scores[i];
        if (i==num-1) high=scores[i];
        sum+=scores [i++];
    }
    if (res<0)
    {
        average=sum/num;
        mid=(low+high)/2;
        high>2*mid||high>2*average||
           high>100||mid>96)res=1;
           else res=0;
    }
    return res;
}
```

On line 1, this routine receives, as arguments, a pointer to the first element of an array of integers, called "scores," and an integer "num" that represents the number of scores contained in the array "scores." This program is purposely written to be inefficient in order to demonstrate, below, difficulties that arise from attempting to correlate instructions in an optimized version of the routine with statements in the source-language routine. The scores in the array "scores" are assumed to be arranged in ascending order.

On line 5, the routine "skewed" assigns the value "−1" to the variable "res." The variable "res" represents the value that will be returned by the routine "skewd." In the very inefficiently written while-loop comprising lines 8–18, the routine "skewed" first tests, on line 10, whether there are any scores in the array "scores." If there are no scores, then the variable "res" is assigned the value "0" on line 12 and execution of the while-loop is discontinued by the break statement on line 13. Otherwise, if this is the first iteration of the loop, as detected by the routine "skewd" on line 15, the variable "low" is assigned to the first score in the array "scores." If this is the final iteration of the loop, as detected on line 16 of the routine "skewed," then the variable "high" is assigned to the final score in the array "scores." On line 17, the routine skewed adds the score represented by the current iteration of the while-loop to the summation variable "sum." If the variable "res" has not been assigned the value "0" on line 12, as detected on line 19, then the routine "skewed" proceeds to compute the average of the scores, on line 21, and the midpoint score on line 22. Then, the routine "skewed" makes a comparison of the values contained in the variables "high," "mid," and "average," on lines 23–24, to determine whether the distribution of scores in the array "scores" is skewed. If the routine "skewed" determines that the distribution is skewed, then the variable "res" is assigned the value "1" on line 34. Otherwise, the variable "res" is assigned the value "0" on line 25. Finally, on line 27, the routine "skewed" returns the value contained in variable "res."

The routine "skewed" rather inefficiently computes the midpoint score on line 22 by saving the first score of the array "scores" in the local variable "low," on line 15, and the last score in the array "scores" in the local variable "high," on line 16. The conditional statements of lines 15 and 16 are unnecessarily repeatedly executed during each iteration of the while-loop. The midpoint score can be more efficiently calculated in the following single statement:

mid=(scores[0]+high)/2

Also, the test on line 10 is unnecessarily executed multiple times within the while-loop.

A pseudo-intermediate-code version of the routine "skewed" is shown below. The instruction formats and meanings will be described in detail following the pseudo-intermediate-code version of the routine "skewed." It should be noted that the target for an instruction in this pseudo-intermediate-code generally is specified as the first operand of the instruction, and the source or sources for an instruction generally are specified as the second and subsequent operands. Approximate source code lines of the routine "skewed" to which the pseudo-intermediate-code instructions correspond are provided as comments, following the comment symbol "*." Register assignments are indicated in the comment block preceding the first instruction on line 1.

```
*************************************************************
* r0      - return address
* r1      - return value
* r2      - &(array[0])
* r3      - num
* r4      - i
* r5      - sum
* r6      - mid
* r7      - low
* r8      - high
* r9      - average
* r10     - res
* r11     -
* r12     -
*************************************************************
```

-continued

```
1 skewed:  sub sp, sp, #36      * 1
2          store 0(sp), r4      * 1
3          store 4(sp), r5      * 1
4          store 8(sp), r6      * 1
5          store 12(sp), r7     * 1
6          store 16(sp), r8     * 1
7          store 20(sp), r9     * 1
8          store 24(sp), r10    * 1
9          store 28(sp), r11    * 1
10         store 32(sp), r12    * 1
11         mov r10, #-1         * 5
12         clr r4               * 6
13         clr r5               * 7
14 L1:     cmp r4, r3           * 8
15         bge L5               * 8
16         cmp r3, #1           *10
17         bge L2               *10
18         clr r10              *12
19         br L5                *13
20 L2:     cmp r4, #0           *15
21         bne L3               *15
22         mov r11, r4          *15
23         lshft r11, #2        *15
24         load r7, r11(r2)     *15
25 L3:     mov r11, r3          *16
26         dec r11              *16
27         cmp r4, r11          *16
28         bne L4               *16
29         mov r11, r4          *16
30         lshft r11, #2        *16
31         load r8, r11(r2)     *16
32 L4:     mov r11, r4          *17
33         lshft r11, #2        *17
34         load r12, r11(r2)    *17
35         add r5, r5, r12      *17
36         inc r4               *17
37         br L1                *18
38 L5:     cmpr 10, #0          *19
39         bge L7               *19
40         div r9, r5, r3       *21
41         add r6, r7, r8       *22
42         rshft r6, #1         *22
43         mov r11, r6          *23
44         lshft r11, #1        *23
45         cmp r8, r11          *23
46         bgt L6               *23
47         mov r11, r9          *23
48         lshft r11, #1        *23
49         cmp r8, r12          *23
50         bgt L6               *23
51         cmp r8, #100         *24
52         bgt L6               *24
53         cmp r6, #96          *24
54         bgt L6               *24
55         mov r10, #0          *25
56         br L7                *25
57 L6:     mov r10, #1          *24
58 L7:     mov r0, r10          *27
59         load r4, 0(sp)       *27
60         load r5, 4(sp)       *27
61         load r6, 8(sp)       *27
62         load r7, 12(sp)      *27
63         load r8, 16(sp)      *27
64         load r9, 20(sp)      *27
65         load r11, 24(sp)     *27
66         load r11, 28(sp)     *27
67         load r12, 32(sp)     *27
68         add sp, sp, #36      *27
69         jmp 0                *27
```

The above intermediate-code version of the routine "skewed" is written in a generic pseudo-assembly-language. The first instruction, on line 1 of the intermediate-code version of "skewed," includes the label "skewed" and the instruction "sub sp,sp, #36." Labels are used as symbolic addresses for target instructions of branch instructions. An instruction, like the above-quoted first instruction, comprises an operation code ("op code") and 0, 1, or more operands. Operands may include labels, registers, virtual registers, and literal values. In the case of the first instruction, the op code is "sub" and the three operands are register "sp," the register "sp," again, and the integer value "36." The first instruction is a subtraction instruction that substracts the number "36" from the contents of register "sp" and place the result into register "sp." Registers are designated by a lower-case "r" followed by a number, such as register "r3," or by a special two-character designation such as the designation "sp" for the dedicated stack pointer register. Labels, other than the initial label "skewed," are designated by an "L" followed by a numeral. Finally, literal integer values are designated by a "#" symbol followed by a numeric representation of the value. Instruction op codes used in the intermediate-level assembly code version of the routine "skewed" include: (1) "cmp," an operation that compares two values; (2) "bne," an operation that causes a branch to another instruction within the program specified by a label when a preceding "cmp" operation determines that the two compared values are not equal; (3) "br," an operation that causes an unconditional branch to a labeled instruction; (4) "mov," an operation that copies a value from a source operand to a destination operand; (5) "dec," an operation that decrements the value of a second operand and stores the result into the register or virtual register specified by a first operand; (6) "lshft," an operation that arithmetically left-shifts the value stored in the register specified by a first operand by the number of places specified by a second operand; (7) "rshft," an analogous operation to the previously described operation "lshft," except that the arithmetic shift is in the right hand direction; (8) "clr," an operation that sets the value of an operand to "0"; (9) "bge," an operation that branches to a labeled instruction when a preceding compare instruction determines that the value of a second operand is greater than or equal to the value of a first operand; (10) "add," an operation that adds the values specified by a second and a third operand and places the result into a first operand; (11) "inc," an operation that increments the value stored in the first operand by 1; (12) "div," an operation that divides the value specified by a second operand by the value specified by a third operand and stores the result in a first operand; (13) "bgt," an operation that branches to a labeled instruction when a previous compare instruction determines that the value of a second operand is greater than the value of a first operand; (14) "jmp," an operation that unconditionally branches to a location specified by an operand; (15) "bge," an operation that causes a branch to another instruction within the program specified by a label when a preceding "cmp" operation determines that the first compared value is identical or greater than the second compared value; (16) "sub," an operation that subtracts the value specified by the third operand from the value specified by the second operand and places the result into the operand; (17) "store," an operation that stores the value specified by the second operand into the memory location specified by the first operand; and (18) "load," operation that loads the memory value specified by the second operand into the register specified by the first operand.

The notation "r1(r2)" specifies the value of a memory location addressed by the contents of register "r2" plus an offset stored in register "r1." This indirect memory addressing is used for accessing values stored in memory. Note that registers "r0," "r1,", "r2" and "r3" have special significance that is defined by the compiler that generates the pseudo-intermediate-level code. Register "r0" contains the return address to which execution control is transferred when the routine has finished. Register "r1" contains the value returned by the routine "skewed." Register "r2" contains the address of the first element of the array "scores," passed to the routine as the first argument, and register "r3" contains the value "num" passed to the routine as the second argument.

The above-described intermediate-level assembly-language version of the routine "skewed" is shown below, in Table 1, with horizontal dashed lines seperating various groups of instructions.

TABLE 1

| | | | | | |
|---|---|---|---|---|---|
| | | | ------B1------ | | |
| LLN: | 1, 5–7 | 1skewed: | | sub sp, sp, #36 | ALN: 1 |
| | | 2 | | store 0(sp), r4 | ALN: 1 |
| | | 3 | | store 4(sp), r5 | ALN: 1 |
| | | 4 | | store 8(sp), r6 | ALN: 1 |
| | | 5 | | store 12(sp), r7 | ALN: 1 |
| | | 6 | | store 16(sp), r8 | ALN: 1 |
| | | 7 | | store 20(sp), r9 | ALN: 1 |
| | | 8 | | store 24(sp); r10 | ALN: 1 |
| | | 9 | | store 28(sp), r11 | ALN: 1 |
| | | 10 | | store 32(sp), r12 | ALN: 1 |
| | | 11 | | mov r10, #–1 | ALN: 5 |
| | | 12 | | clr r4 | ALN: 6 |
| | | 13 | | clr r5 | ALN: 7 |
| | | | ------B2------ | | |
| LLN: | 8 14 | | L1: | cmp r4, r3 | ALN: 8 |
| | | 15 | | bge L5 | ALN: 8 |
| | | | ------B3------ | | |
| LLN: | 10 | 16 | | cmp r3, #1 | ALN: 10 |
| | | 17 | | bge L2 | ALN: 10 |
| | | | ------B4------ | | |
| LLN: | 12,13 | 18 | | clr r10 | ALN: 12 |
| | | 19 | | br L5 | ALN: 13 |
| | | | ------B5------ | | |
| LLN: | 15 | 20 | L2: | cmp r4, #0 | ALN: 15 |
| | | 21 | | bne L3 | ALN: 15 |
| | | | ------B6------ | | |
| LLN: | 15 | 22 | | mov r11, r4 | ALN: 15 |
| | | 23 | | lshft r11, #2 | ALN: 15 |
| | | 24 | | load r7, r11(r2) | ALN: 15 |
| | | | ------B7------ | | |
| LLN: | 16 | 25 | L3: | mov r11, r3 | ALN: 16 |
| | | 26 | | dec r11 | ALN: 16 |
| | | 27 | | cmp r4, r11 | ALN: 16 |
| | | 28 | | bne L4 | ALN: 16 |
| | | | ------B8------ | | |
| LLN: | 16 | 29 | | mov r11, r4 | ALN: 16 |
| | | 30 | | lshft r11, #2 | ALN: 16 |
| | | 31 | | load r8, r11(r2) | ALN: 16 |
| | | | ------B9------ | | |
| LLN: | 17,18 | 32 | L4: | mov r11, r4 | ALN: 17 |
| | | 33 | | lshft r11, #2 | ALN: 17 |
| | | 34 | | load r12, r11(r2) | ALN: 17 |
| | | 35 | | add r5, r5, r12 | ALN: 17 |
| | | 36 | | inc r4 | ALN: 17 |
| | | 37 | | br L1 | ALN: 18 |
| | | | ------B10------ | | |
| LLN: | 19 | 38 | L5: | cmp r10,#0 | ALN: 19 |
| | | 39 | | bge L7 | ALN: 19 |
| | | | ------B11------ | | |
| LLN: | 21,22 | 40 | | div r9, r5, r3 | ALN: 21 |
| | 23 | 41 | | add r6, r7, r8 | ALN: 22 |
| | | 42 | | rshft r6, #1 | ALN: 22 |
| | | 43 | | mov r11, r6 | ALN: 23 |
| | | 44 | | lshft r11, #1 | ALN: 23 |
| | | 45 | | cmp r8, r11 | ALN: 23 |
| | | 46 | | bgt L6 | ALN: 23 |
| | | | ------B12------ | | |
| LLN: | 23 | 47 | | mov r11, r9 | ALN: 23 |
| | | 48 | | lshft r11, #1 | ALN: 23 |
| | | 49 | | cmp r8, r12 | ALN: 23 |
| | | 50 | | bgt L6 | ALN: 23 |
| | | | ------B13------ | | |
| LLN: | 24 | 51 | | cmp r8, #100 | ALN: 24 |
| | | 52 | | bgt L6 | ALN: 24 |
| | | | ------B14------ | | |
| LLN: | 24 | 53 | | cmp r6, #96 | ALN: 24 |
| | | 54 | | bgt L6 | ALN: 24 |
| | | | ------B15------ | | |
| LLN: | 25 | 55 | | mov r10, #0 | ALN: 25 |
| | | 56 | | br L7 | ALN: 25 |
| | | | ------B16------ | | |
| LLN: | 24 | 57 | L6: | mov r10, #1 | ALN: 24 |

TABLE 1-continued

```
----------------------------------B17--------------------------
LLN:    27    58     L7:   mov r0, r10         ALN: 27
              59           load r4, 0(sp)      ALN: 27
              60           load r5, 4(sp)      ALN: 27
              61           load r6, 8(sp)      ALN: 27
              62           load r7, 12(sp)     ALN: 27
              63           load r8, 16(sp)     ALN: 27
              64           load r9, 20(sp)     ALN: 27
              65           load r11, 24(sp)    ALN: 27
              66           load r11, 28(sp)    ALN: 27
              67           load r12, 32(sp)    ALN: 27
              68           add sp, sp, #36     ALN: 27
              69           jmp 0               ALN: 27
```

The groups of structions separated by horizontal dashed lines are called "basic blocks," and are labeled in Table 1 with a "B" followed by a numeral. A basic block is a contiguos group of instructions that start with an instruction that may be the target of a branch or jump instruction or that may be reached during sequential execution of the instruction of the routine. No other instruction within a basic block, other than the first instruction, can be the target of a branch or jump instruction. No instruction within a basic block, other than the last instruction in the basic block, can transfer execution control from within the basic block to an instruction outside of the basic block. Thus, all the instructions in a basic block execute in sequence after the first instruction of the basic block is executed. For example, the "cmp" and "bge" instruction on lines 14–15 in Table 1 together comprise basic block "B2" because the "cmp" instruction on line 14 is the target of the "br" instruction on line 37, and because the "bge" instruction on line 15 is a branch instruction. Many compiler techniques are simplified by considering basic blocks rather than individual instruction. In essence, a basic block can be considered a sort of metal instruction that can either be executed or not executed, depending on the flow of control during execution of a program.

An important characterization of a program is a control flow graph. FIG. 1 shows a control flow graph that represents the intermediate-level assembly-language version of the routine "skewed." The nodes in the control flow graph of FIG. 1 correspond to basic blocks of the intermediate-level assembly-language routine shown in Table 1. The edges linking the nodes, shown by arrows in FIG. 1, such as arrow 102, represent possible transfer of execution control by the last instruction of one basic block to the first instruction of another basic block. For example, the "bge" instruction on line 15 of Table 1, the last instruction of basic block "B2," may transfer control to the "cmp" instruction on line 38, the first instruction of basic block "B10." However, if the "bge" instruction on line 15 does not transfer execution control to basic block "B10," execution control is automatically transferred to the "cmp" instruction on line 16, the first instruction of basic block "B3," by virtue of the sequential nature of program execution. Thus, in FIG. 1, the node representing basic block "B2" 104 is shown with edges pointing to basic block "B10" 102 and to basic block "B3" 106.

Table 1 includes one or more logical line numbers ("LLN") and actual line numbers ("ALN") associated with basic blocks and instructions, respectively. For example, basic block 1 is associated with LLNs 1 and 5–7. This means that the instructions of basic block 1 implement source code statements of the source-level version of the routine "skewed," shown above, that occur on line 1 and on lines 5–7. In Table 1, the instructions on lines 1–10 are all associated with ALN 1, indicating that these instructions implement the first line of the source-language version of routine "skewed." These instructions reserve room on the stack and save the contents of registers "r4"–"r12" onto the stack. Line 11 in Table 1 implements the source-language statement on line 5 of the source-language version of the routine "skewed" that assigns the value "−1" to the variable "res." Note that, in the intermediate code version of the routine "skewed," shown in Table 1, the LLNs and ALNs directly correspond to one another. In other words, basic block "B1" is associated with LLNs 1 and 5–7 and the instructions contained in basic block "B1" are themselves associated with ALNs 1 and 5–7.

Figure 2:
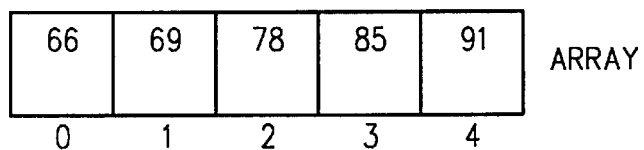
FIG. 2 shows a small sample array containing five scores.

FIG. 2 shows a small sample array containing five scores. Table 2, below, shows a histogram of the number of times each instruction in the intermediate code version of the routine "skewed," shown in Table 1, is executed when the routine "skewed" is executed with the array shown in FIG. 2 as input, along with the integer "5," representing the number of scores in the array. For example, the single symbol "x" in the first column of Table 2 indicates that instructions 1–13 are each executed one time when the routine "skewed" is run. The second column in Table 2 indicates that instructions 14–15 are both executed six times when the routine "skewed" is executed on the array shown in FIG. 2. The histogram shown in Table 2, below, is indicative of the profile data that may be collected during the analysis of the execution of a routine, such as the routine "skewed." In this case, a notation, represented by the symbol "x," is made every time an instruction is executed. Commonly, a histogram will show the relative frequencies of execution of various instructions rather than the absolute count. More practical profiling techniques may trap, during execution, only certain types of instructions and save counts representing the number of times each instruction is trapped, or may perform a statistical analysis by interrupting execution of the program at random short intervals and noting the instruction that is currently being executed or that will next be executed by the computer. Although statistical profiling does not give exact numbers of times of execution of each instruction, it may efficiently provide quite accurate relative frequencies of execution of the different instructions, particularly when the profile data is collected over many different executions of a single routine or program.

TABLE 2

|   |   |   |   |   |   |   |   |   |   |   |
|---|---|---|---|---|---|---|---|---|---|---|
|   | x |   |   |   |   |   |   |   |   |   |
|   | x | x |   | x |   | x |   |   |   |   |
|   | x | x |   | x |   | x |   | x |   |   |
|   | x | x |   | x |   | x |   | x |   |   |
|   | x | x |   | x |   | x |   | x |   |   |
| x | x | x | x | x | x | x | x | x | x | x |
| 1–13 | 14–15 | 16–17 | 18–19 | 20–21 | 22–24 | 25–28 | 29–31 | 32–37 | 38–56 | 57 | 59–70 |

It is very straightforward to use the profile data, represented above in Table 2, to annotate the edges and control flow diagram, shown in FIG. 1, or to create a table of branch points within the routine "skewed" and list the frequency that each branch instruction branched during execution of the routine to each possible target of the branch instruction.

Figure 3:
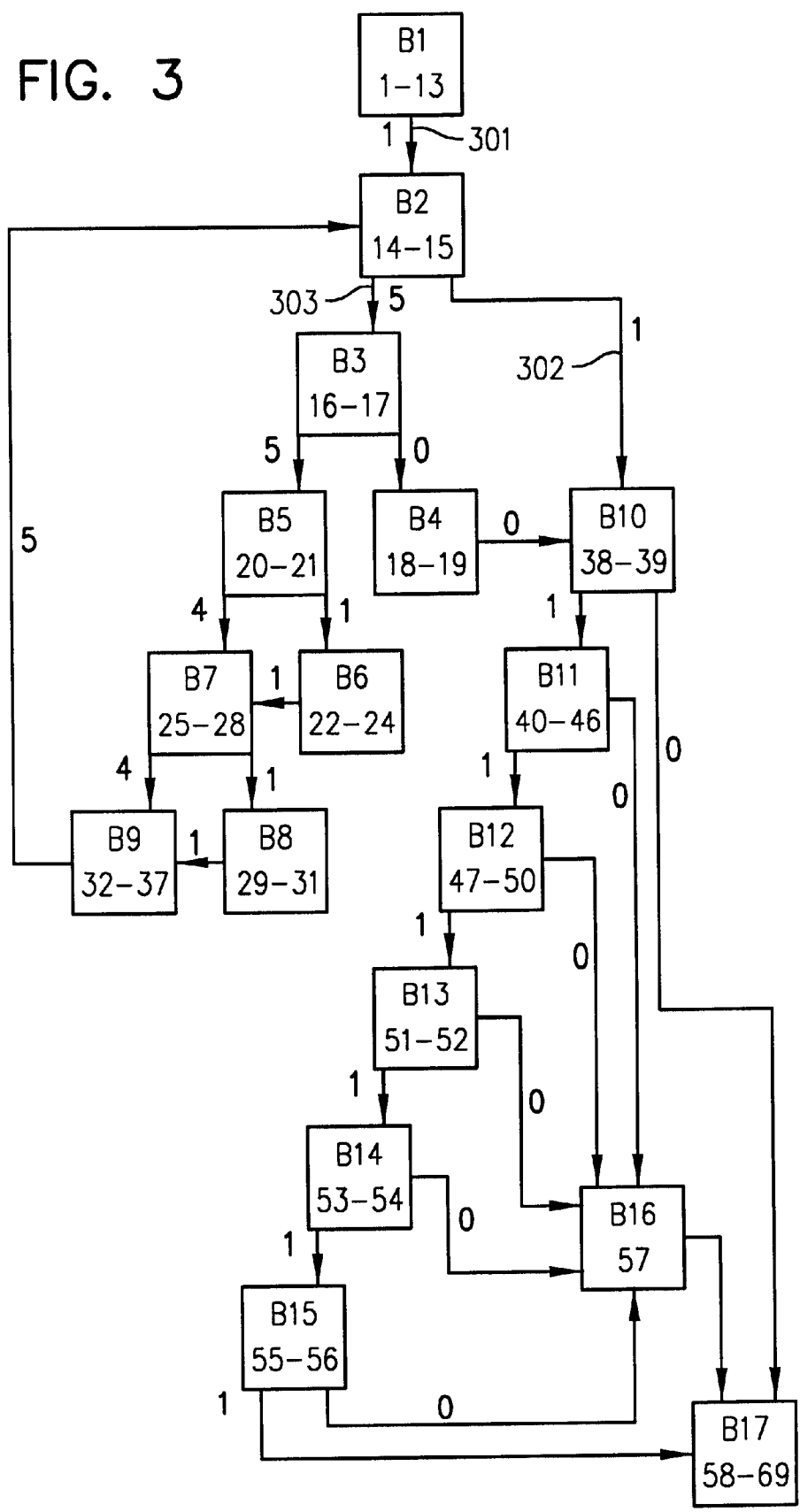
FIG. 3 shows the control flow diagram that represents the routine "skewed."

FIG. 3 shows the control flow diagram that represents the routine "skewed" annotated with the frequencies that control flows through each edge of the control flow diagram during execution of the routine "skewed" with the array shown in FIG. 2 as input. It is easy to decide, for example, that edge 301 should be annotated to indicate that control flows through edge 301 only once during execution of the routine "skewed." This is because, as shown in Table 2, instructions 1–13 in basic block "B1" are all executed only one time. This is a trivial result, since there are no edges that point to basic block "B1," and, therefore, once basic block "B1" is executed, there is no way for control to flow back to it. Similarly, because, as shown in Table 2, instructions 38 and 39 are executed only once, we know that edge 302 should be annotated with the number "1."

Since instructions 14 and 15 are executed six times, as shown in Table 2, then edge 303 must have the value "6" minus "1"="5." This analysis is similar to the analysis of inputs and outputs in circuit diagrams. The number of times the final instruction in the basic block is executed can be obtained directly from Table 2. The sum of the numerical annotations of the edges flowing out from a basic block must equal the number of times the final branch instruction of the basic block is executed. This analysis can be used when the profile data comprises absolute counts of instruction execution or when the profile data comprises relative frequencies of execution.

Because there is a direct correspondence between the intermediate-code instructions and the source-language statements of the routine "skewed," the annotations in FIG. 3 can be directly correlated with the source-language statements. or example, as can be seen in the annotated intermediate-code version of the routine "skewed," shown in Table 1, the branch on line 15 is associated with the while statement on line 8 of the source-language version of "skewed." The five times that control fell through the branch instruction on line 15 to the "cmp" instruction on line 16 represents the number of times the while-loop began iterating on line 10 of the source-language version of the routine "skewed." The single time that the "bge" instruction on line 15 caused a branch to line 38, in Table 1, corresponds to termination of the while-loop on line 8 of the source-language version of the routine "skewed," and execution of the following source-language statement on line 14 of the source-language version of the routine "skewed."

Table 3, shown below, is yet another representation of the profile data shown above in Table 2. In Table 3, the first two columns correspond to the intermediate-code line and the source-language line of each branch instruction in the intermediate-code version of the routine "skewed," shown in Table 1, and the third and fourth columns represent the intermediate-code line and source-language line of the target instruction of the branch instruction specified in the first two columns. The fifth column contains a count of the number of times the branch instruction designated in columns one and two has executed to transfer control to the target specified in columns three and four. For example, the first line in Table 3 indicates that the "bge" instruction on line 15 in Table 1, corresponding to the while-loop in line 8 of the source-language version of the routine "skewed," shown above, branches to line 38 of Table 1, corresponding to source-language line 19, once during execution of the routine "skewed." Thus, armed with profile data as exemplified by Table 2, it is easy to either annotate the control flow graph, shown in FIG. 3, or create a branch instruction table, as shown in Table 3, to provide a very clear indication of the number of times branch instructions within the intermediate-code version of the routine or control statements within the source-language version of the routine caused execution to resume at various corresponding target instructions or target source statements, respectively.

TABLE 3

| branch | | target | | |
|---|---|---|---|---|
| assembly line | source line | assembly line | source line | count |
| 15 | 8 | 38 | 19 | 1 |
| 15 | 8 | 16 | 10 | 5 |
| 17 | 10 | 20 | 15 | 5 |
| 17 | 10 | 18 | 12 | 0 |
| 19 | 13 | 38 | 7 | 0 |
| 21 | 15 | 25 | 8 | 4 |
| 21 | 15 | 22 | 8 | 1 |
| 28 | 16 | 32 | 17 | 4 |
| 28 | 16 | 29 | 16 | 1 |
| 37 | 18 | 14 | 8 | 5 |
| 39 | 19 | 58 | 27 | 0 |
| 39 | 19 | 40 | 21 | 1 |
| 46 | 23 | 57 | 24 | 0 |
| 46 | 23 | 47 | 23 | 1 |
| 50 | 23 | 57 | 24 | 0 |
| 50 | 23 | 51 | 24 | 1 |
| 52 | 24 | 57 | 24 | 0 |
| 52 | 24 | 53 | 24 | 1 |
| 54 | 24 | 57 | 24 | 0 |
| 54 | 24 | 55 | 25 | 1 |
| 56 | 25 | 58 | 27 | 1 |

Optimized Example

The following source-language version of the routine "skewed" is meant to illustrate how an optimizing compiler might optimize the unoptimized routine "skewed," shown above. Note that optimized source-language code is not generated by an optimizing compiler and that the optimizations represented by this optimized source-language version of "skewed" would not necessarily be produced by any particular optimizing compiler. This optimized source-language version of "skewed" is provided simply for illustrative purposes.

```
int skewed (int *array, int num)
{
    int i, sum, mid, average, high, res;
    rest=-1;
    if(num<1)res=0;
    else
    {
        i=0;
        sum=0;
        high=array[num-1];
        while (i<num)sum+=array[i++];
        average=sum/num;
        mid=(array[0]+high)/2;
        if(high>2*mid||high>2*average||
            high>100||mid>96)res=1;
        else res=0;
    }
    return res;
}
```

An assembly-language version of the optimized routine "skewed" is shown below:

```
skewed:  sub sp, sp, #32
         store 0(sp), r4
         store 4(sp), r5
         store 8(sp), r6
```

-continued

```
        store 12(sp), r7
        store 16(sp), r8
        store 20(sp), r9
        store 24(sp), r10
        store 28(sp), r11
        mov r9, #–1
        cmp r3, #1
        bge L1
        clr r9
        br L5
    L1: cir r4
        cir r5
        mov r10, r3
        dec r10
        lshft r10, #2
        load r7,r10(r2)
    L2: cmp r4,r3
        bge L3
        mov r10,r4
        lshft r10, #2
        load r11, r10(r2)
        add r5,r5,r11
        inc r4
        br L2
    L3: div r8,r5,r3
        load r10, 0(r2)
        add r6,r10,r7
        rshft r6, #1
        mov r10,r6
        lshft r10, #1
        cmp r7,r10
        bgt L4
        mov r10,r8
        lshft r10, #1
        cmp r7, r11
        bgt L4
        camp r6, #96
        bgt L4
        mov r9, #0
        br L5
    L4: mov r9, #1
    L5: mov r0,r9
        load r4, 0(sp)
        load r5, 4(sp)
        load r6, 8(sp)
        load r7, 12(sp)
        load r8, 16(sp)
        load r9, 20(sp)
        load r10, 24(sp)
        load r11, 28(sp)
        add sp, sp, #32
        jmp 0
```

Comparisons of the unoptimized and optimized source-language versions of "skewed" and assembly-language versions of "skewed" will show that many statements and instructions have been eliminated, and the order of the statements and instructions has changed substantially. Table 4, below, shows a histogram of instruction execution, similar to Table 2, for execution of the optimized assembly-language version of "skewed" on the array shown in FIG. 2.

TABLE 4

| 1–17 | 18–19 | 20–25 | 26–27 | 28–33 | 34–49 | 50–51 | 52 | 53–63 |
|---|---|---|---|---|---|---|---|---|
|  |  |  | x |  |  |  |  |  |
|  |  |  | x | x |  |  |  |  |
|  |  |  | x | x |  |  |  |  |
|  |  |  | x | x |  |  |  |  |
|  |  |  | x | x |  |  |  |  |
| x | x | x | x | x | x | x |  | x |

Table 5, shown below, is a branch table created from the profile data shown in Table 4, similar to Table 3.

TABLE 5

| branch | | target | | |
|---|---|---|---|---|
| assembly line | source line | assembly line | source line | count |
| 19 |  | 53 |  | 0 |
| 27 |  | 34 |  | 1 |
| 27 |  | 28 |  | 5 |
| 33 |  | 26 |  | 5 |
| 41 |  | 52 |  | 0 |
| 41 |  | 42 |  | 1 |
| 45 |  | 52 |  | 0 |
| 45 |  | 46 |  | 1 |
| 47 |  | 52 |  | 0 |
| 47 |  | 48 |  | 1 |
| 49 |  | 52 |  | 0 |
| 49 |  | 50 |  | 1 |
| 51 |  | 53 |  | 1 |

Table 5 illustrates the problem of correlating profile data collected from the execution of optimized routines with source-language versions of those routines. For example, the fourth entry in Table 5 indicates that a branch instruction on line 27 of the optimized assembly-language version of the routine branches once to a target instruction on 34. Referring to Table 1, line 27 does not contain a branch instruction but instead contains a "cmp" instruction. Furthermore, line 34, the target of this branch instruction, occurs within a basic block, but, by definition, the target of any branch instruction must be the first instruction of a basic block. The annotated unoptimized assembly-language version of the routine, shown in Table 1, is the only link between the optimized assembly-language version of the routine and the source-language routine. Thus, columns two and four in Table 5 cannot be completed, as they were in Table 3. There is no direct way to relate the branch instructions of the optimized version of the routine "skewed" back to the unoptimized source-language version of the routine "skewed." Of course, if the illustrative optimized source-language routine, shown above, were available, a correlation could be directly made. However, as pointed out above, the optimized source-language version of routines is not generated by optimizing compilers and is not available in order to assist the profile data correlation.

Method of the Present Invention

Table 6, shown below, shows the optimized assembly-language version of the routine "skewed," shown above in the previous subsection, overlaid onto the basic block structure of Table 1.

TABLE 6

| LLN: | | | | |
|---|---|---|---|---|
| ------B1------ | | | | |
| LLN: | 1, 5–9 | 1 | skewed: sub sp, sp, #32 | ALN: 1 |
| | | 2 | store 0(sp), r4 | ALN: 1 |
| | | 3 | store 4(sp), r5 | ALN: 1 |
| | | 4 | store 8(sp), r6 | ALN: 1 |
| | | 6 | store 12(sp), r7 | ALN: 1 |
| | | 7 | store 16(sp), r8 | ALN: 1 |
| | | 8 | store 20(sp), r9 | ALN: 1 |
| | | 9 | store 24(sp), r10 | ALN: 1 |
| | | 10 | store 28(sp), r11 | ALN: 1 |
| | | 11 | mov r9, #−1 | ALN: 5 |
| ------B2------ | | | | |
| LLN: | 8 | | | |
| ------B3------ | | | | |
| LLN: | 10 | 16 | cmp r3, #1 | ALN: 10 |
| | | 17 | bge L1 | ALN: 10 |
| ------B4------ | | | | |
| LLN: | 12,13 | 18 | clr r9 | ALN: 12 |
| | | 19 | br L5 | ALN: 13 |
| ------B5------ | | | | |
| LLN: | 15 | | | |
| ------B6------ | | | | |
| LLN: | 15 | | | |
| ------B7------ | | | | |
| LLN: | 16 | 20 | L1: clr r4 | ALN: 6 |
| | | 21 | clr r5 | ALN: 7 |
| | | 22 | mov r10, r3 | ALN: 16 |
| | | 23 | dec r10 | ALN: 16 |
| ------B8------ | | | | |
| LLN: | 16 | 24 | lshft r10, #2 | ALN: 16 |
| | | 25 | load r7,r10(r2) | ALN: 16 |
| ------B9------ | | | | |
| LLN: | 17,18 | 26 | L2: cmp r4, r3 | ALN: 8 |
| | | 27 | bge L3 | ALN: 8 |
| | | 28 | mov r10, r4 | ALN: 17 |
| | | 29 | lshft r10, #2 | ALN: 17 |
| | | 30 | load r11, r10(r2) | ALN: 17 |
| | | 31 | add r5, r5, r11 | ALN: 17 |
| | | 32 | inc r4 | ALN: 17 |
| | | 33 | br L2 | ALN: 18 |
| ------B10------ | | | | |
| LLN: | 19 | | | |
| ------B11------ | | | | |
| LLN: | 21,22 | 34 | L3: div r8, r5, r3 | ALN: 21 |
| | | 35 | load r10, 0(r2) | ALN: 15 |
| | 23 | 36 | add r6, r10, r7 | ALN: 22 |
| | | 37 | rshft r6,#1 | ALN: 22 |
| | | 38 | mov r10, r6 | ALN: 23 |
| | | 39 | lshft r10, #1 | ALN: 23 |
| | | 40 | cmp r7, r10 | ALN: 23 |
| | | 41 | bgt L4 | ALN: 23 |
| ------B12------ | | | | |
| LLN: | 23 | 42 | mov r10, r8 | ALN: 23 |
| | | 43 | lshft r10, #1 | ALN: 23 |
| | | 44 | cmp r7, r11 | ALN: 23 |
| | | 45 | bgt L4 | ALN: 23 |
| ------B13------ | | | | |
| LLN: | 24 | 46 | cmp r7, #100 | ALN: 24 |
| | | 47 | bgt L4 | ALN: 24 |
| ------B14------ | | | | |
| LLN: | 24 | 48 | cmp r6, #96 | ALN: 24 |
| | | 49 | bgt L4 | ALN: 24 |
| ------B15------ | | | | |
| LLN: | 25 | 50 | mov r9, #0 | ALN: 25 |
| | | 51 | br L5 | ALN: 25 |
| ------B16------ | | | | |
| LLN: | 24 | 52 | L4: mov r9, #1 | ALN: 24 |
| ------B17------ | | | | |
| LLN: | 27 | 53 | L5: mov r0, r9 | ALN: 27 |
| | | 54 | load r4, 0(sp) | ALN: 27 |
| | | 55 | load r5, 4(sp) | ALN: 27 |
| | | 56 | load r6, 8(sp) | ALN: 27 |
| | | 57 | load r7, 12(sp) | ALN: 27 |
| | | 58 | load r8, 16(sp) | ALN: 27 |
| | | 59 | load r9, 20(sp) | ALN: 27 |
| | | 60 | load r10, 24(sp) | ALN: 27 |
| | | 61 | load r11, 28(sp) | ALN: 27 |
| | | 62 | add sp, sp, #32 | ALN: 27 |
| | | 63 | jmp 0 | ALN: 27 |

The technique for overlaying an optimized assembly-language program onto the template of the basic block structure of the unoptimized assembly-language version of the program is described in U.S. Pat. No. 5,713,010. That patent is hereby incorporated by reference in its entirety. Essentially, the ALN associated with each instruction in the unoptimized version of the routine remains associated with the instruction in the optimized version of the routine, regardless of how the instruction is moved relative to other instructions or whether the instruction is duplicated. By contrast, the LLNs associated with the basic blocks remain fixed. For example, consider a case where both a branch instruction and its target are both moved during the optimization. One case of this phenomenon can be seen by comparing Tables 1 and 6. The "bge" instruction on line 15 of Table 1 corresponds to the "bge" instruction on line 27 of Table 6. The target of that branch instruction is line 38 in Table 1 but, in Table 6, the target of the branch instruction is line 34. Using the LLNs and ALNs in Table 6, the original source-language location for the branch insertion can be reconstructed. The ALN of the "bge" instruction on line 27 of Table 6 is line 8. This means that the branch instruction corresponds to a statement in the unoptimized source-language version of the routine "skewed" on line 8. Inspection of the unoptimized source-language version of the routine "skewed" reveals that the branch instruction implements a portion of the while statement on line 8. The target of the branch instruction on line 27 of Table 6 is line 34 of Table 6. Line 34 occurs in basic block "b11." That basic block is, in turn, associated with LLN 21. Inspection of the unoptimized source-language version of the routine "skewed," above, reveals that line 21 is where the average is calculated and is the first non-conditional statement following the while-loop comprising lines 8–18. Thus, by using the ALN as the source-language location of the branch instruction, and using the LLN of the basic block in which the target instruction is located, one can relate branch instructions and the targets of branch instructions in the optimized assembly-language version of a routine back to the unoptimized source-language version of the routine.

Table 7, below, shows the reconstruction of the unoptimized source-language locations of the branch and target instructions of the optimized assembly-language version of the routine "skewed." Thus, Table 7 corresponds to Table 5, shown above, but with the source line information completed by the process outlined above for each branch instruction. Note that the correspondence between Table 7 and the source-language version of the routine "skewed" is not necessarily perfect. For example, the unoptimized source-language statement on line 19 is removed during optimization, and thus, in Table 7, there is no branch instruction corresponding to source line 19. However, for the critical control statements, such as the while-loop on line 8 of the unoptimized source-language version of the routine "skewed," a correlation can be easily constructed and entered into Table 7.

TABLE 7

| branch | | target | | |
|---|---|---|---|---|
| assembly line | source line | assembly line | source line | count |
| 17 | 10 | 20 | 16 | 1 |
| 17 | 10 | 18 | 12 | 0 |
| 19 | 13 | 53 | 27 | 0 |
| 27 | 8 | 34 | 21 | 1 |
| 27 | 8 | 28 | 17 | 5 |
| 33 | 18 | 26 | 17 | 5 |
| 41 | 23 | 52 | 24 | 0 |
| 41 | 23 | 42 | 23 | 1 |
| 45 | 23 | 52 | 24 | 0 |
| 45 | 23 | 46 | 24 | 1 |
| 47 | 24 | 52 | 24 | 0 |
| 47 | 24 | 48 | 24 | 1 |
| 49 | 24 | 52 | 24 | 0 |
| 49 | 24 | 50 | 25 | 1 |
| 51 | 25 | 53 | 27 | 1 |

Implementation

The C++-like pseudo code, shown, below provides a straightforward implementation of the method of the present invention.

```
class instruction
{
    Boolean branch();
}
class routine
{
    instruction *getinstruction (int pc);
    in ALN (int pc);
    in LLN (int pc);
}
class arcTable
{
    arcTableEntry *getEntry (int branch, int target);
    arcTableEntry *newEntry (int branch, int target, int weight);
    int getNumEntries ();
    arcTableEntry *getNthEntry (int n);
}
class arcTableEntry
{
    arcTableEntry (int branch, int target);
    void incCount (int weight);
    int getBranch();
    int getTarget();
    int getWeight();
}
storeArc
    (int pc, int nextPC, int weight=1, arcTable & arcTab, routine & rtn)
{
    arcTableEntry *entry;
    if(rtn.getInstruction(pc)->branch())
{
entry = arcTab.getEntry(rtn.ALN(pc), rtn.LLN(nextPC));
if(entry!=NULL)entry-=incCount(weight);
else arcTab.newEntry (rtn.ALN(pc), rtn.LLN(nextPC), weight);
    }
}
```

The class "instruction," declared above on lines 1–4, represents an instruction of an optimized assembly-language or machine-code version of a routine. Only one method, the method "branch," is declared on line 3. This method returns the Boolean an value TRUE if the instruction is a branch instruction, and returns the Boolean value FALSE if the instruction is not a branch instruction.

The class "routine," declared above on lines 6–11, represents an optimized, assembly-language or machine-code routine for which the run-time memory location is known. Three methods are declared within the class "routine" on lines 8–10: (1) the method "getInstruction" that takes a memory address, or the contents of program counter, as an argument and returns a pointer to the instruction at that address; (2) the method "ALN" that takes a memory address, or the contents of program counter, as an argument and returns the ALN associated with the instruction at that address; and (3) the method "LLN" that takes a memory address, or the contents of program counter, as an argument and returns the LLN associated with the basic block in which the instruction at that address resides.

The class "arcTable," declared above on lines 13–19, represents an arc or branch table similar to Tables 3, 5, and 7, shown above in previous subsections, but having columns only for the source line numbers of the branch instructions and targets of the branch instructions and a relative frequency, or weight, for each arc. An arc table represented by an instance of the class "arcTable" thus includes columns 2, 4, and 5 of the above-mentioned tables. The class "arcTable" includes four methods declared on lines 15–18: (1) the method "get Entry" that takes the source line numbers of a branch and a target instruction as arguments and returns a pointer to the entry within the arc table represented by an instance of the class "arcTable" having corresponding branch and target source line numbers, if there is such an entry, and a NULL pointer is there is no such entry; (2) the method "newEntry" that takes the source line numbers of a branch and target and a weight, creates a new entry in the arc table represented by the an instance of class "arcTable" that includes the source line numbers and weight supplied in the arguments, and returns a pointer to the new entry; (3) the method "getNumEntries" that returns the number of entries in the arc table represented by an instance of the class "arcTable;" and (4) the method "getNthEntry" that returns a pointer to entry represented by the ordinal supplied as the argument, if such an entry exists, and a NULL pointer if no such entry exists.

The class "arcTableEntry," declared above on lines 21–28, represents a single entry in an arc table represented by an instance of the class "arcTable," discussed above. The methods shown for the class "arcTableEntry" include: (1) the constructor "arcTableEntry;" (2) the method "incCount" that increments the count, or weight, associated with the entry by the number supplied in the argument "weight;" (3) and three methods "getBranch," "getTarget," and "getWeight" that return the source line numbers and count contained within the arc table entry represented by an instance of the class "arcTableEntry."

It should be noted that implementations of the methods of the above-described classes are not shown. These methods can be implemented in many different ways, and the implementations are quite straightforward. The declarations of classes are given to facilitate understanding of the routine "storeArc," implemented above on lines 30–40.

The routine "storeArc" may be called during profile data collection conducted on an executing optimized machine-code program or routine to build up an arc table representing the frequency of execution of branches within the source-language version of the program or routine, as discussed above in the previous subsection. The routine "storeArc" may be called, for example, at each point during profile data collection when an instruction is trapped or the program counter is sampled. The routine "storeArc" takes 5 arguments: (1) "pc," the memory address of a branch instruction; (2) "nextPC," the memory address of the target instruction of the branch instruction referred to by the first argument; (3)

"weight," the weight, or count, to assign to an arc created for the branch and target instructions or to increment the weight, or count, associated with an arc that represents the branch and target instructions; (4) a reference "arcTab" to an instance of the class "arcTable" in which profile data is being accumulated and (5) a reference "rtn" to an instance of the class "routine" that represents a routine that is being profiled.

The routine "storeArc" determines, on line 34, whether the argument "pc" refers to a branch instruction. If so, then the routine "storeArc" calls, on line 36, the "getentry" method of the instance of the class "arcTable" referred to by the reference "arcTab," using the methods "ALN" and "LLN" of the class "routine" to generate the source line numbers of the branch and target instructions supplied as arguments "pc" and "nextPC," respectively, and places the result of the call into the variable "entry." If an entry exists in arcTab for the source line numbers of the branch and target instructions, as determined by the routine "storeArc" on line 37, then the count, or weight, associated with that entry is incremented on line 37 accumulate the instruction trap or program counter sampling that generated the call to the routine "storeArc." If no entry exists, then, on line 38, a new entry is created in the arc table represented by the instance of the class "arcTable" referred to by the reference "arcTab." Thus, by calling the routine "storeArc" during profiling of an executing optimized machine-code version of a routine or program, an arc table similar to Table 7 can be compiled to represent a profile of the frequency of execution of control statements within the source-language version of the routine or program.

Although the present invention has been described in terms of preferred embodiments, it is not intended that the invention be limited to these embodiments. Modifications within the spirit of the invention will be apparent to those skilled in the art. For example, various additional types of data may be collected and stored in an arc table, and many different types of formats for arc tables may be employed. The present invention may be implemented in any number of different languages on any number of different types of computer systems. The profile data can also be stored in a database management system. Various techniques may be employed for determining and storing logical line numbers and actual line numbers along with the instructions of an optimized routine or program. Rather than creating an arc table, the technique of the present invention may be used to directly relate optimized routine or program instructions back to source language code in order to produce annotated source files or source line profile histograms.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A method for relating profile data collected during execution of an optimized computer program back to the source-language description of the computer program, the optimized computer program including actual line numbers associated with each intermediate code instruction and logical line numbers associated with each basic block within the intermediate code program, the method comprising:

accumulating profile data by storing and incrementing counts associated with execution of branch instructions, each execution of a branch instruction transferring control to a particular target instruction, and each count associated with one particular branch instruction and one particular target instruction; and relating each accumulated count to the actual line number of the branch instruction associated with the count and the logical line number of the basic block that contains the target instruction associated with the count.

2. The method of claim 1 wherein each accumulated count is related to the actual line number of the branch instruction associated with the count and the logical line number of the basic block that contains the target instruction associated with the count during the accumulation of profile data.

3. The method of claim 1 wherein each accumulated count is related to the actual line number of the branch instruction associated with the count and the logical line number of the basic block that contains the target instruction associated with the count following the accumulation of profile data.

4. The method of claim 1 further including:

creating an arc table to represent the accumulated counts related to the actual line number of the branch instruction associated with the count and the logical line number of the basic block that contains the target instruction associated with the count, each entry of the arc table including the actual line number associated with a branch instruction, the logical line number of the basic block that contains a target instruction of the branch instruction, and the count that represents the frequency of execution of the branch instruction resulting in transfer of control to the target instruction.

5. The arc table of claim 4 stored in the memory of a computer system.

6. The method of claim 1 wherein the profile data is accumulated by trapping execution of branch instructions during execution of the optimized computer program and incrementing the count associated with the branch instruction and the target instruction to which the branch instruction transfers control.

7. The method of claim 1 wherein the profile data is accumulated by interrupting execution of the program at various times and accumulating counts indicating the relative numbers of times different instructions are executed.

8. The method of claim 1 wherein the profile data is accumulated by accessing information gathered at run-time during execution of a program by branch prediction hardware incorporated within a processor that executes the program.

9. The method of claim 1 wherein the profile data is accumulated during dynamic translation of source code that includes annotations to direct the translator to collect particular profile data.

10. The method of claim 1 further including:

using the accumulated counts related back to the actual line numbers of the branch instructions associated with the counts and the logical line numbers of the basic blocks that contain the target instructions associated with the counts to annotate the source-language description of the computer program.

11. A computer-readable medium containing computer instructions that implement a method for relating profile data collected during execution of an optimized computer program back to the source-language description of the computer program, the optimized computer program including actual line numbers associated with each intermediate code instruction and logical line numbers associated with each basic block within the intermediate code program, the method implemented by:

accumulating profile data by storing and incrementing counts associated with execution of branch instructions, each execution of a branch instruction transferring control to a particular target instruction, and each count associated with one particular branch instruction and one particular target instruction; and relating each accumulated count to the actual line number of the branch instruction associated with the count and the logical line number of the basic block that contains the target instruction associated with the count.

12. Electronic signals embodied in a carrier wave that encode the computer instructions of a computer program that implements a method for relating profile data collected during execution of an optimized computer program back to the source-language description of the computer program, the optimized computer program including actual line numbers associated with each intermediate code instruction and logical line numbers associated with each basic block within the intermediate code program, the method implemented by:

accumulating profile data by storing and incrementing counts associated with execution of branch instructions, each execution of a branch instruction transferring control to a particular target instruction, and each count associated with one particular branch instruction and one particular target instruction; and relating each accumulated count to the actual line number of the branch instruction associated with the count and the logical line number of the basic block that contains the target instruction associated with the count.

13. A method for relating profile data collected during execution of an optimized computer program back to the source-language description of the computer program, the method comprising:

compiling the source-language description of the computer program into intermediate code;

determining a basic block structure of the intermediate code;

assigning actual line numbers to each intermediate code instruction;

assigning logical line numbers to each basic block within the intermediate code program;

optimizing the intermediate code by eliminating, duplicating, and moving intermediate code instructions within the basic block structure such that logical line numbers remain fixed to the basic blocks whereas actual line numbers are fixed to instructions; and accumulating profile data by storing and incrementing counts associated with execution of branch instructions to transfer control to target instructions, each count associated with an actual line number of a branch instruction and a logical line number associated with the target instruction of the branch instruction.

14. A system for profiling execution of an optimized computer program, the system comprising:

a computer system on which the optimized computer program is executed;

the optimized computer program stored within the computer system, each instruction of the optimized computer program associated with an actual line number, and each basic block of the optimized computer program associated with a number of logical line numbers; and a profiling component that monitors execution of the optimized computer program, accumulates relative frequencies with which each branch instruction transfers control to target instructions, and relates the accumulated relative frequencies with which branch instructions transfer control to target instructions back to corresponding source language statements.

15. The system of claim 14 wherein the profiling component relates the accumulated relative frequency with which a branch instruction transfers control to a target instruction back to corresponding source language statements by associating the accumulated relative frequency with the actual line number associated with the branch instruction and the logical line number associated with the basic block that contains the target instruction.

16. The system of claim 15 wherein the profiling component creates an arc table to represent the accumulated relative frequencies, each entry of the arc table including the actual line number associated with a branch instruction, the logical line number of the basic block that contains a target instruction of the branch instruction, and the accumulates relative frequency of execution of the branch instruction resulting in transfer of control to the target instruction.

17. The system of claim 14 wherein the profiling component uses the accumulated relative frequencies with which branch instructions transfer control to target instructions related back to corresponding source language statements to annotate a source-language description of the computer program.

18. The system of claim 14 wherein the profiling component further comprises:

a monitoring component that monitors execution of the optimized computer program and accumulates relative frequencies with which each branch instruction transfers control to target instructions; and a source relating component that relates the accumulated relative frequencies with which branch instructions transfer control to target instructions back to corresponding source language statements.

19. The system of claim 18 wherein the monitoring component and the source relating component are run on different computer systems.

* * * * *